United States Patent
Kraus et al.

(10) Patent No.: US 11,140,000 B2
(45) Date of Patent: Oct. 5, 2021

(54) TRANSMISSION OF SIGNALS

(71) Applicant: Siemens Aktiengesellschaft, Munich (DE)

(72) Inventors: Ludwig Kraus, Ruhstorf (DE); Christian Maul, Nuremberg (DE); Volker Müller, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/961,589

(22) PCT Filed: Dec. 18, 2018

(86) PCT No.: PCT/EP2018/085454
§ 371 (c)(1),
(2) Date: Jul. 10, 2020

(87) PCT Pub. No.: WO2019/137756
PCT Pub. Date: Jul. 18, 2019

(65) Prior Publication Data
US 2021/0067368 A1 Mar. 4, 2021

(30) Foreign Application Priority Data
Jan. 12, 2018 (EP) .................................... 18151421

(51) Int. Cl.
*H04L 12/40* (2006.01)
(52) U.S. Cl.
CPC .................................. *H04L 12/40* (2013.01)
(58) Field of Classification Search
CPC .................................................... H04L 12/40
(Continued)

(56) References Cited

U.S. PATENT DOCUMENTS 5,933,609 A 8/1999 Walker et al.
6,738,920 B1 5/2004 Horne
(Continued)

FOREIGN PATENT DOCUMENTS

CN 104953420 A 9/2015
DE 298 09 721 U1 12/1998
(Continued)

OTHER PUBLICATIONS

PCT International Search Report and Written Opinion of International Searching Authority dated Mar. 20, 2019 corresponding to PCT International Application No. PCT/EP2018/085454 filed Dec. 18, 2018.
(Continued)

Primary Examiner — Fitwi Y Hailegiorgis
(74) Attorney, Agent, or Firm — Henry M. Feiereisen LLC

(57) ABSTRACT

A signal transmission apparatus has several serially-connected signal distribution modules, wherein interfaces of two adjacent signal distribution modules are each interconnected by a signal bridge. The signal transmission apparatus also has at least one direct connection between two signal distribution modules, which is routed through all signal bridges arranged between the two adjacent signal distribution modules and interconnects the interfaces of the adjacent signal bridges. In addition, a signal transmission bus is routed through all signal bridges and via all interfaces. The interfaces of all signal distribution modules have an identical design and all signal bridges connect two interfaces in the same way.

15 Claims, 3 Drawing Sheets

(58) Field of Classification Search
USPC .......................................... 375/257; 326/41
See application file for complete search history.

(56) References Cited

U.S. PATENT DOCUMENTS

| | | |
|---|---|---|
| 2006/0059325 A1 | 3/2006 | Milne et al. |
| 2010/0283505 A1* | 11/2010 | Koch ............... H03K 19/17736 326/41 |
| 2014/0269764 A1 | 9/2014 | Borgeson et al. |
| 2014/0359190 A1 | 12/2014 | Metzner et al. |
| 2016/0283427 A1 | 9/2016 | Chaudhari et al. |

FOREIGN PATENT DOCUMENTS

| | | |
|---|---|---|
| DE | 19750470 A1 | 6/1999 |
| DE | 10 2014 019 725 B3 | 8/2017 |
| EP | 3 076 250 A1 | 10/2016 |
| RU | 2015138478 A | 4/2017 |

OTHER PUBLICATIONS

Fengnian, Tian: "Research and Realization of Control Algorithm for Electronic Controlled Hydraulic Power Steering System"; Nanjing Agricultural University, Dec. 2009; Jun. 15, 2013.

Gu, Sun et al; "A Real-Time Multi-Channel Signal Acquisition Card Based on PCI Express Interface"; 2009 International Conference on Communication Software and Networks; 978-0-7695-3522-7/09 $25.00© 2009 IEEE, DOI 10.1109/ICCSN.2009.73; Feb. 28, 2009.

* cited by examiner

TRANSMISSION OF SIGNALS

CROSS-REFERENCES TO RELATED APPLICATIONS

This application is the U.S. National Stage of International Application No. PCT/EP2018/085454, filed Dec. 18, 2018, which designated the United States and has been published as International Publication No. WO 2019/137756 A1 and which claims the priority of European Patent Application, Serial No. 18151421.7, filed Jan. 12, 2018, pursuant to 35 U.S.C. 119(a)-(d).

BACKGROUND OF THE INVENTION

The invention relates to a signal transmission apparatus and a method for the transmission of signals.

In particular, the invention relates to the transmission of signals, on which different latency requirements are placed, by signal transmission apparatuses having a modular construction. A latency requirement on a signal is understood here to mean a maximum signal propagation time assigned to a signal between a sender and a receiver. In this case, a latency requirement on a signal increases as the maximum signal propagation time assigned to the signal decreases. For the transmission of signals on which particularly high latency requirements are placed, use is often made of direct connections between a sender and a receiver. A direct connection is also referred to as a point-to-point connection. In modularly constructed signal transmission apparatuses, a direct connection between two modules is normally realized by a separate transmission line between the two modules. For the transmission of signals on which lower latency requirements are placed, use is generally made of transmission lines which connect a multiplicity of modules together and are realized by a bus system, for example. The realization of direct connections by means of individual transmission lines in each case results in a high degree of complexity and high costs for a signal transmission apparatus.

EP 3 076 250 A1 discloses a method and a system for assigning socket addresses to modules in an industrial control system. The modules are constructed in a daisy-chain topology. When it is switched on, a first module in the chain reads its socket address from an entry that can be configured by a user, or sets its socket address to a standard value. The first module communicates with its neighbor immediately to the right using a special one-hop message. The adjacent modules communicate with each other in order to receive the information of the other. The first module then sets a release signal between the modules and sends a socket number in a firmware report to the neighbor. The neighbor checks whether the activation signal is set and checks whether the socket number is a valid socket number. If this is the case, the adjacent module accepts the socket and the method is continued until the last module.

DE 10 2014 019 725 B3 discloses an electronic switching apparatus comprising a communication bus and switching units which are coupled together and connected to the communication bus, wherein a coupling output of a switching unit is coupled to a coupling input of the following switching unit. Each switching unit has a control unit for controlling the coupling output and a bus interface for attaching the control unit to a communication bus for automatic address allocation of the respective switching unit.

DE 298 09 721 U1 discloses an arrangement for open-loop and/or closed-loop control of technical processes using at least one network comprising a plurality of signal processing nodes, these being designed to generate desired values and regulating values for the technical process or processes and actual values derived from the technical process or processes, and being coupled to a shared serial bus for the communication of data and instructions among themselves.

The object underlying the invention is that of specifying a signal transmission apparatus and a method for the transmission of signals, in which the realization of direct connections is improved in particular.

SUMMARY OF THE INVENTION

According to one aspect of the invention, the object is achieved by a signal transmission apparatus which comprises a plurality of signal distribution modules which are connected in series. Two adjacent signal distribution modules are each connected to one another by means of a signal bridge which connects an interface of one of the two signal distribution modules to a corresponding interface of the other signal distribution module. The signal transmission apparatus further comprises at least one direct connection between two signal distribution modules, which is guided through all signal bridges arranged between the two signal distribution modules and via the interfaces each connected to one another by these signal bridges, and a signal transmission bus which is guided through all signal bridges and via all interfaces. The interfaces of all signal distribution modules have an identical design and all signal bridges connect two interfaces in the same way.

Advantageous embodiments of the invention are the subject matter of subclaims.

The signal transmission apparatus allows the transmission of signals between signal distribution modules both via at least one direct connection (point-to-point connection) and via a signal transmission bus. In particular, this allows signals on which particularly high latency requirements are placed to be transmitted via a direct connection, while signals on which no particularly high latency requirements are placed can be transmitted via the signal transmission bus. Both the direct connections and the signal transmission bus are guided between the signal distribution modules by means of signal bridges, which connect two interfaces of adjacent signal distribution modules in each case. By virtue of the identical design of all interfaces and the same type of connection of the interfaces by means of the signal bridges, the invention advantageously reduces the complexity of the connection of the signal distribution modules, particularly in respect of the realization of the direct connections, compared with conventional modular signal transmission apparatuses in which each direct connection is realized by means of a separate transmission line.

An embodiment of the invention provides for an electrical power supply line which is guided through all signal bridges and via all interfaces. In particular, provision can be made for at least one signal distribution module to draw power from the power supply line or feed power into the power supply line. This embodiment of the invention allows the signal distribution modules to be supplied with electrical energy by means of a power supply line which is likewise guided through the signal bridges. Therefore no additional power supply lines are required for the supply of electrical energy to the signal distribution modules. Furthermore, provision can also be made for electrical energy to be fed into the power supply line by at least one signal distribution module.

A further embodiment of the invention provides for a fluid line which is guided through all signal bridges and via all interfaces. In particular, provision can be made for at least one signal distribution module to draw fluid from the fluid line or feed fluid into the fluid line. This embodiment of the invention allows the delivery of a fluid to signal distribution modules and/or the removal of a fluid from signal distribution modules, e.g. in order to cool signal distribution modules, by means of a fluid line which is likewise guided through the signal bridges. Therefore no additional fluid lines are required for the delivery and/or removal of the fluid.

A further embodiment of the invention provides for all signal bridges to be of equal length. This allows all signal bridges to have an identical design and the number of shared parts for the components of the signal transmission apparatus can be increased.

A further embodiment of the invention provides for each signal bridge to comprise a ribbon cable or a flexible circuit board. This allows signal distribution modules to be connected to one another in a flexible manner.

A further embodiment of the invention provides for at least one signal distribution module to be configured to receive and/or send signals via the signal transmission bus. This allows signal distribution modules to communicate with one another via the signal transmission bus.

A further embodiment of the invention provides for plug-type connections by means of which an interface can be connected to a signal bridge in each case. This allows connections of the interfaces and signal bridges to be assembled and disassembled easily.

A further embodiment of the invention provides for each interface of a signal distribution module to have a number of direct connection contacts for direct connections, and for the direct connection contacts to be connected, in a contact sequence that is identical for all interfaces, to direct connection lines for direct connections, said direct connection lines being guided in the signal distribution module to the interface. In particular, in each signal distribution module in which at least one direct connection terminates, provision can be made in this case for the direct connection lines of the direct connections terminating in the signal distribution module to be connected to the first direct connection contacts, according to the contact sequence, of a first interface of the signal distribution module, and for each further direct connection contact of the first interface to be connected by means of a direct connection line to a direct connection contact of the second interface, whose position in the contact sequence lies before, by the number of first direct connection contacts, the position of the direct connection contact to which it is connected at the first interface. Furthermore, each signal bridge preferably connects each direct connection contact of one of the two interfaces connected by the signal bridge to exactly one direct connection contact of the other of the two interfaces connected by the signal bridge, wherein the direct connection contacts connected to one another by the signal bridge have the same position in the contact sequence.

The above cited embodiments of the invention realize the same type of connection, for all signal distribution modules, of direct connection lines of the signal distribution modules to the interfaces. in particular, they allow a line arrangement of direct connection lines in the signal distribution modules, whereby direct connection ones that terminate in a signal distribution module are connected to defined positions of an interface of the signal distribution module, and the other direct connection lines connect this interface to direct connection contacts of the other interface at precisely these defined positions. This allows signal distribution modules in which direct connections terminate to be configured with the same line arrangement of their direct connection ones. This also increases the number of shared parts for the signal transmission apparatus and advantageously reduces the complexity of the realization of the direct connections.

A further embodiment of the invention provides for the signal distribution modules to be configured for open-loop or closed-loop control of a power converter. In particular, at least one signal distribution module can have a driver unit, to which a direct connection is guided, for at least one electronic switching unit of the power converter. These embodiments of the invention take into consideration that a signal transmission apparatus according to the invention is advantageously suitable in particular for the open-loop or closed-loop control of a power converter with electronic switching units, since particularly high latency requirements are placed on signals that are used to activate the electronic switching units of a power converter. Therefore the activation of the switching units preferably takes place via direct connections.

According to a further embodiment of the invention, each direct connection between two signal distribution modules is guided through all signal distribution modules arranged between the two signal distribution modules.

According to another aspect of the invention, the object is achieved by a method for the transmission of signals using a signal transmission apparatus, wherein a higher latency requirement is placed on first signals than on second signals, a first signal is transmitted via a direct connection of the signal transmission apparatus, and a second signal is transmitted via the signal transmission bus of the signal transmission apparatus. The method takes into consideration that a direct connection normally allows a shorter signal propagation time than a signal transmission bus Advantageous embodiments of the invention are the subject matter of subclaims.

BRIEF DESCRIPTION OF THE DRAWING

The properties, features and advantages of the invention as described above, and the manner in which these are achieved, are clearer and easier to understand in the context of the following description of exemplary embodiments, these being explained in greater detail with reference to the drawings, in which.

DETAILED DESCRIPTION OF PREFERRED EMBODIMENTS

Figure 1:
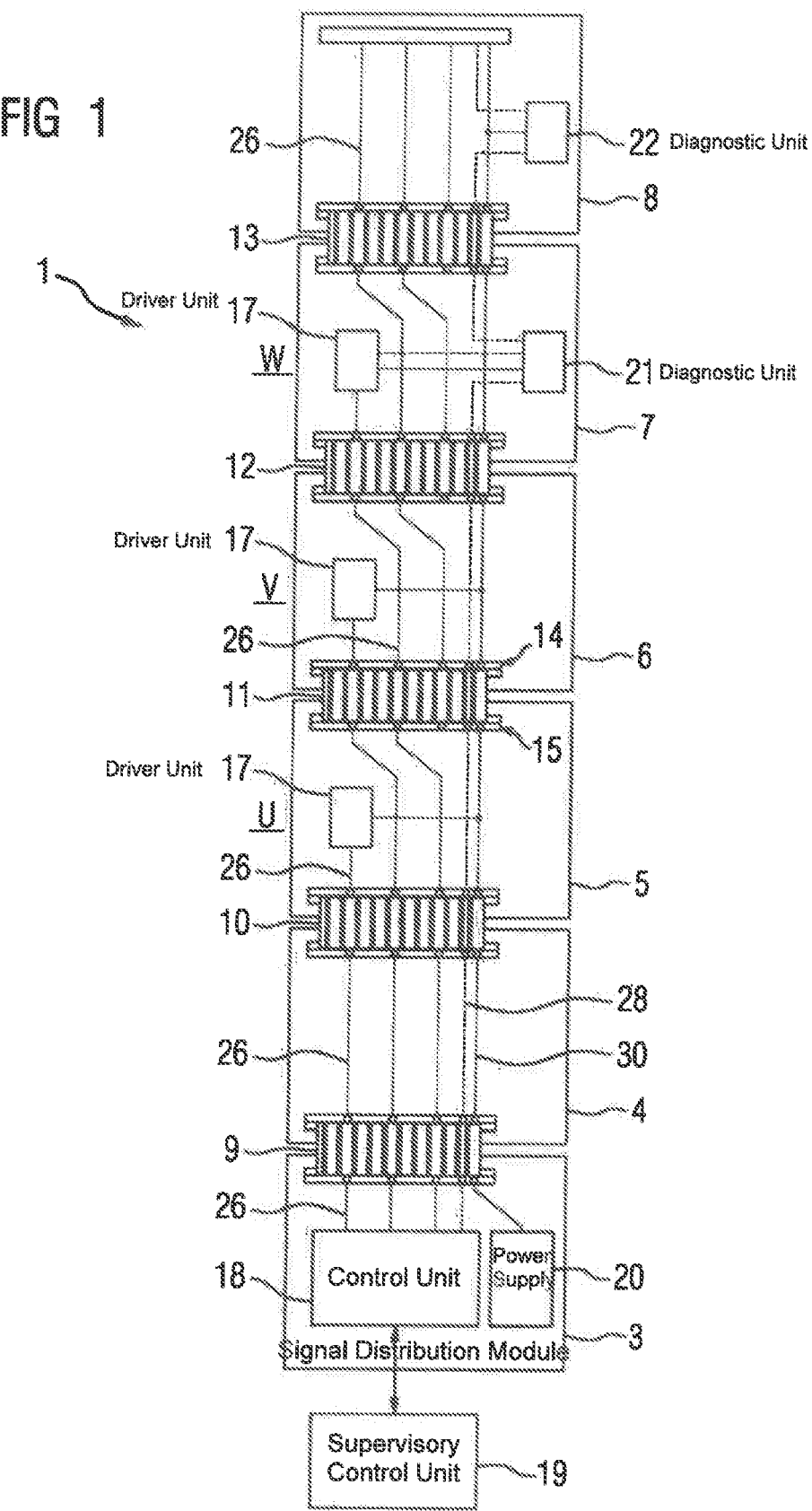
FIG. 1 shows a block diagram of a signal transmission apparatus.

Parts which correspond to each other are denoted by the same reference characters in the figures.

FIG. 1 shows an exemplary embodiment of a signal transmission apparatus 1. The signal transmission apparatus 1 comprises six signal distribution modules 3 to 8 connected in series, which are configured for open-loop or closed-loop control of a three-phase power converter. Each two adjacent signal distribution modules 3 to 8 are connected to one another by means of a signal bridge 9 to 13 which connects an input-side first interface 14 of one of the two signal distribution modules 3 to 8 to a corresponding output-side second interface 15 of the other signal distribution module 3 to 8, In this case, a first signal bridge 9 connects a first signal distribution module 3 to a second signal distribution module 4, a second signal bridge 10 connects the second signal distribution module 4 to a third signal distribution module 5, a third signal bridge 11 connects the third signal distribution module 5 to a fourth signal distribution module 6, a fourth signal bridge 12 connects the fourth signal distribution module 6 to a fifth signal distribution module 7, and a fifth signal bridge 13 connects the fifth signal distribution module 7 to a sixth signal distribution module 8.

Figure 2:
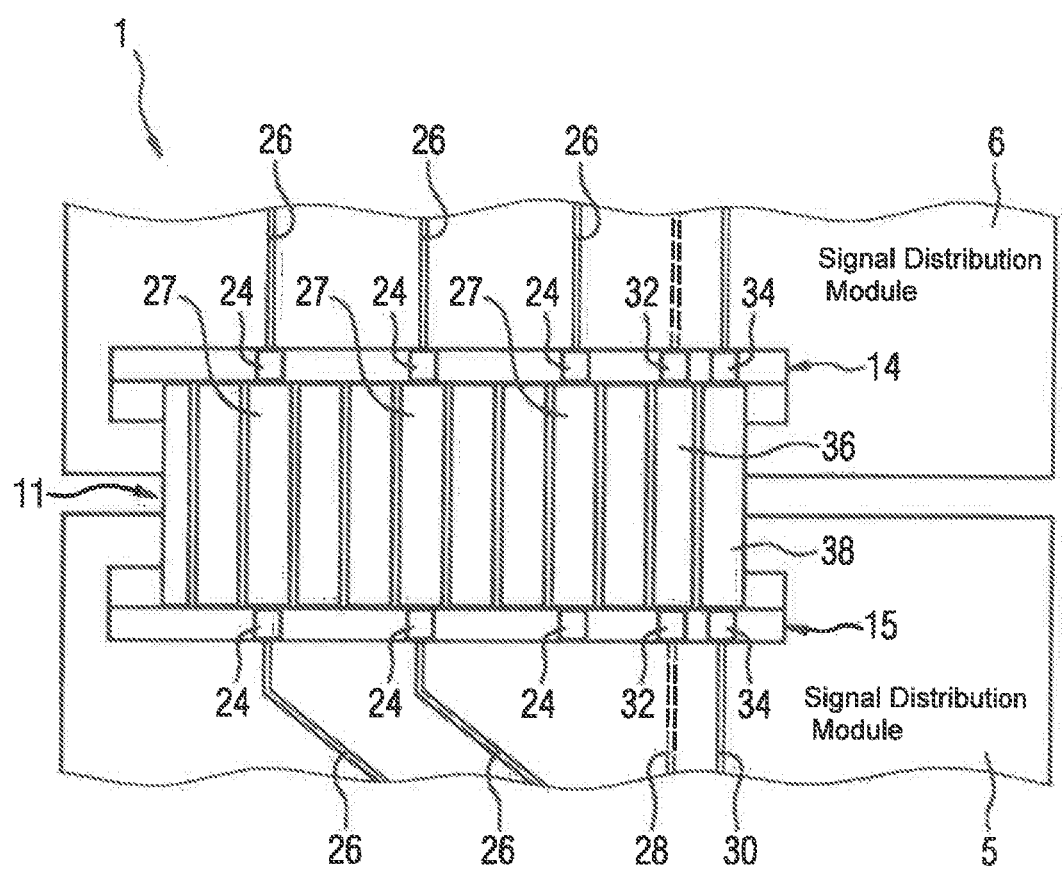
FIG. 2 shows an enlarged section of the signal transmission apparatus illustrated in FIG. 1.

FIG. 2 shows an enlarged section of the signal transmission apparatus 1 shown in FIG. 1 in the region of the third signal bridge 11.

The first signal distribution module 3 has a hardware-based closed-loop control unit 18 and a power supply unit 20. The hardware-based closed-loop control unit 18 is activated by a supervisory closed-loop control unit 19 and is configured to generate signals for open-loop or closed-loop control of the power converter. The power supply unit 20 is configured to supply components of the signal transmission apparatus 1 with electrical energy.

The second signal distribution module 4 uses neither signals generated by the first signal distribution module 3 nor energy provided by the power supply unit 20, but simply transfers said signals and energy onward.

The third signal distribution module 5, the fourth signal distribution module 6 and das fifth signal distribution module 7 each have a driver unit 17 for at least one electronic switching unit of the power converter, e.g. for a half-bridge of two bipolar transistors with insulated gate electrodes (IGBT=insulated-gate bipolar transistor).

The fifth signal distribution module 7 and the sixth signal distribution module 8 each have a diagnostic unit 21, 22 for determining a status of the signal transmission apparatus 1.

The signal transmission apparatus 1 has three direct connections. A first direct connection connects the hardware-based closed-loop control unit 18 of the first signal distribution module 3 to the driver unit 17 of the third signal distribution module 5, and is guided through the first signal bridge 9 and the second signal bridge 10 and via the interfaces 14, 15 that are connected to one another in each case by means of these signal bridges 9, 10. A second direct connection connects the hardware-based closed-loop control unit 18 of the first signal distribution module 3 to the driver unit 17 of the fourth signal distribution module 6 and is guided through the signal bridges 9, 10, 11 and via the interfaces 14, 15 that are connected to one another in each case by means of these signal bridges 9, 10, 11. A third direct connection connects the hardware-based closed-loop control unit 18 of the first signal distribution module 3 to the driver unit 17 of the fifth signal distribution module 7 and is guided through the signal bridges 9 to 12 and via the interfaces 14, 15 that are connected to one another in each case by means of these signal bridges 9 to 12.

The interfaces 14, 15 of ail signal distribution modules 3 to 8 have an identical design. Each interface 14, 15 has three direct connection contacts 24 for direct connections. The direct connection contacts 24 of each interface 14, 15 of a signal distribution module 3 to 8 are connected, in a contact sequence that is identical for ail interfaces 14, 15, to direct connection lines 26 which are guided in the signal distribution module 3 to 8 to the interface 14, 15. In the example illustrated in FIG. 1, the contact sequence organizes the direct connection contacts 24 from left to right, i.e. the left-hand direct connection contact 24 is the first, the middle direct connection contact 24 is the second and the right-hand direct connection contact 24 is the third of the direct connection contacts 24 according to the contact sequence. If an interface 14, 15 is only connected to two direct connection lines 26 (this applies to the second interfaces 15 of the signal distribution modules 5 to 7 in the example shown in FIG. 1), then only the left-hand direct connection contact 24 and the middle direct connection contact 24 are connected to a direct connection line 26, while the right-hand direct connection contact 24 is not connected to a direct connection line 26.

Within each of the signal distribution modules 5 to 7 comprising a driver unit 17, a direct connection terminates at the driver unit 17. The driver unit 17 is connected by means of a direct connection line 26 to the first direct connection contact 24, according to the contact sequence, of the first interface 14 of the signal distribution module 5 to 7. Each further direct connection contact 24 of the first interface 14 is connected by means of a direct connection line 26 to a direct connection contact 24 of the second interface 15, whose position lies one before the position of the direct connection contact 24 to which it is connected at the first interface 14. In the illustration according to FIG. 1, therefore, as per the contact sequence which organizes the direct connection contacts 24 from left to right as cited above, in each of the signal distribution modules 5 to 7, a first direct connection line 26 connects the driver unit 17 to the left-hand direct connection contact 24 of the first interface 14, a second direct connection line 26 connects the middle direct connection contact 24 of the first interface 14 to the left-hand direct connection contact 24 of the second interface 15, and a third direct connection line 24 connects the right-hand direct connection contact 24 of the first interface 14 to the middle direct connection contact 24 of the second interface 15.

Each signal bridge 9 to 13 connects each direct connection contact 24 of a first interface 14 to exactly one direct connection contact 24 of a second interface 15, wherein the direct connection contacts 24 which are connected to one another by means of the signal bridge 9 to 13 have the same position in the contact sequence. In the illustration according to FIG. 1, therefore, each signal bridge 9 to 13 connects respectively to one another the two left-hand direct connection contacts 24, the two middle direct connection contacts 24 and the two right-hand direct connection contacts 24 of the two interfaces 14, 15 that are connected by means of the signal bridge 9 to 13. In this case, the direct connection contacts 24 are connected to one another in each case by means of a bridge direct connection line 27 of the signal bridge 9 to 13.

In addition to the direct connections, the signal transmission apparatus 1 illustrated in FIG. 1 has a signal transmission bus 28 and a power supply line 30, each of which is guided through all signal bridges 9 to 13 and via all interfaces 14, 15. For this, each interface 14, 15 has a bus contact 32 and a power line contact 34. The bus contacts 32 of two interfaces 14, 15 which are connected by means of a signal bridge 9 to 13 are connected to one another by means of a bridge bus segment 36 of the signal bridge 9 to 13. The power line contacts 34 of two interfaces 14, 15 which are connected by means of a signal bridge 9 to 13 are connected to one another by means of a bridge power line segment 38 of the signal bridge 9 to 13.

All signal bridges 9 to 13 connect two interfaces 14, 15 in the same way. Only the lengths of the signal bridges 9 to 13 may differ from each other. However, the lengths of the signal bridges 9 to 13 are preferably also identical, such that the signal bridges 9 to 13 do not differ from each other. For example, the signal bridges 9 to 13 are designed as a ribbon cable or as a flexible circuit board in each case. In addition, for example, a signal bridge 9 to 13 and an interface 14, 15 can be connected to one another via a plug-type connection. In this case, for example, each interface 14, 15 is designed as the male part of a plug-type connection and each signal bridge 9 to 13 has corresponding female parts of a plug-type connection. Alternatively, each interface 14, 15 is designed as the female part of a plug-type connection and each signal bridge 9 to 13 has corresponding male parts of a plug-type connection.

The signal transmission bus 28 is connected to the hardware-based closed-loop control unit 18 of the first signal distribution module 3, the driver unit 17 and the diagnostic unit 21 of the fifth signal distribution module 7 and the diagnostic unit 22 of the sixth signal distribution module 8. The signal transmission bus 28 is simply guided through the other signal distribution modules 4 to 6 in the exemplary embodiment illustrated in FIG. 1.

The power supply line 30 is connected to the power supply unit 20 of the first signal distribution module 3, the driver units 17 of the signal distribution modules 5 to 7 and the diagnostic units 21, 22 of the signal distribution modules 7 and 8. The signal transmission bus 28 is simply guided through the second signal distribution module 4 in the exemplary embodiment illustrated in FIG. 1.

Signals which differ from each other by virtue of the latency requirements placed upon them are transmitted via the direct connections and the signal transmission bus 28. First signals, on which a higher latency requirement is placed, are transmitted via the direct connections. Second signals, on which a lower latency requirement is placed, are transmitted via the signal transmission bus 28.

First signals comprise in particular control signals for the driver units 17 for the activation of the switching units of the power converter. For example, control signals for a respective phase U, V, W of the power converter are transmitted via the direct connections. By way of example, FIG. 1 shows that control signals for a first phase U are supplied to the driver unit 17 of the third signal distribution module 5 via the first direct connection, control signals for a second phase V are supplied to the driver unit 17 of the fourth signal distribution module 6 via the second direct connection, and control signals for a third phase W are supplied to the driver unit 17 of the fifth signal distribution module 7 via the third direct connection.

Second signals comprise e.g. status signals with status information relating to the statuses of signal distribution modules 3 to 8, e.g. a temperature, an electrical voltage and/or an electrical power.

The exemplary embodiment of a signal transmission apparatus 1 shown in FIG. 1 realizes the signal distribution modules 5 to 7 with an identical design and arrangement of the driver units 17 and direct connection lines 26. The only difference between these signal distribution modules 5 to 7 is the presence of the diagnostic unit 21 in the signal distribution module 7. In a modification of this exemplary embodiment, the signal distribution modules 5 and 6 can however also comprise such a diagnostic unit 21, so that all signal distribution modules 5 to 7 have an identical design. In addition, all signal bridges 9 to 13 have a design that is of the same type or even identical. This allows an advantageously extensive number of shared parts for the signal distribution modules 3 to 8 and a reduced complexity of connection of the signal distribution modules 3 to 8, particularly for the realization of the direct connections. It also allows a high degree of flexibility when arranging the signal distribution modules 3 to 8 and when subsequently changing the sequence or number of signal distribution modules 3 to 8, without additional development and manufacturing costs.

The embodiment shown in FIG. 1 is merely an exemplary illustration of the invention, and can be modified and extended in various ways. For example, signal distribution modules 3 to 8 can have further direct connections and/or further or other components which are connected to direct connections, the signal transmission bus 28 and/or the power supply line 30, Furthermore, as an alternative or addition to the power supply line 30, the signal transmission apparatus 1 can have e.g. a fluid line which is guided through all signal bridges 9 to 13 and via all interfaces 14, 15, by means of which a fluid can be delivered to individual or all signal distribution modules 3 to 8, e.g. for the cooling of components. The direct connections and the signal transmission bus 28 can also be realized in various ways, e.g. by means of electrically conductive wires or optical fibers.

In addition, the signal transmission apparatus 1 can also be configured for open-loop or closed-loop control of a system other than a power converter. For example, the signal transmission apparatus 1 can be configured for open-loop or closed-loop control of a hydraulic or pneumatic system. In this case, instead of driver units 17 for activating switching units of a power converter, for example, some signal distribution modules 5 to 7 could have control units for activating hydraulic or pneumatic valves.

Figure 3:
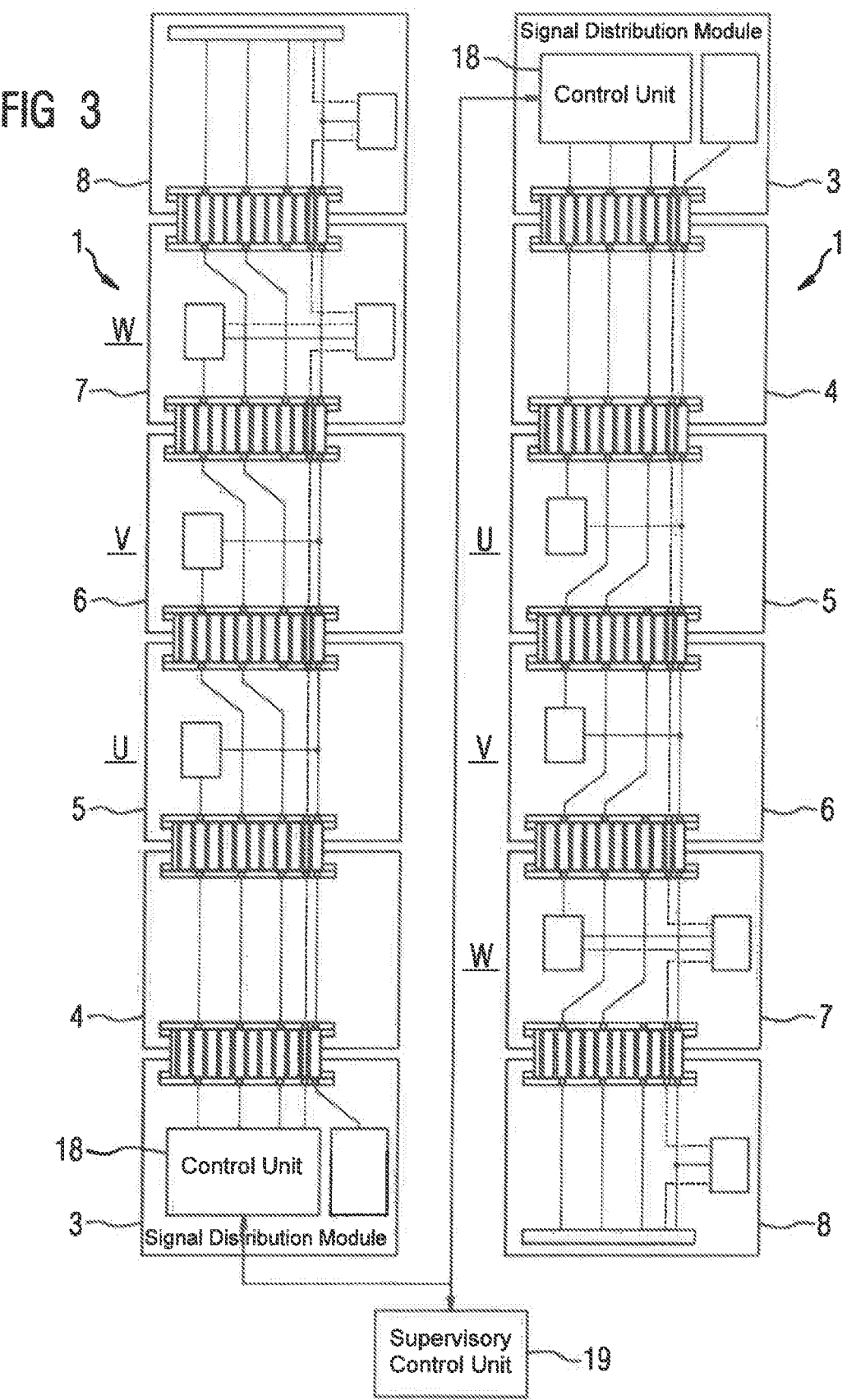
FIG. 3 shows a block diagram of two signal transmission apparatuses.

FIG. 3 shows a block diagram of two signal transmission apparatuses 1, each of which is configured in the same way as the signal transmission apparatus shown in FIG. 1. The hardware-based closed-loop control units 18 of both signal transmission devices 1 are controlled by a supervisory closed-loop control unit 19. The signal distribution modules 3 to 8 of the signal transmission apparatuses 1 are arranged in reciprocally inverse sequence. As a result of this, the direct connections of the two signal transmission apparatuses 1 have opposing signal transmission directions. A signal transmission via direct connections in two signal transmission directions is thereby possible. Relays can also be provided for switchable reversal of the signal transmission direction of the direct connections.

Although the invention is illustrated and described in detail with reference to preferred exemplary embodiments, it is not restricted by the examples disclosed herein, and other variations may be derived therefrom by a person skilled in the art without thereby departing from the scope of the invention.

The invention claimed is:

1. A signal distribution module for a signal transmission apparatus, comprising:
   a first interface having a plurality of first connection contacts which have a first defined contact sequence, and
   a second interface having a plurality of second connection contacts which have a second defined contact sequence,
   wherein at least one connection line connected to at least one of the plurality of the first connection contacts terminates within the signal distribution module,
   wherein a remainder of the plurality of the first connection contacts is connected to the second connection contacts by direct connection lines such that a position of a connection between a direct connection line and respective connection contact of the defined second contact sequence is shifted, with respect to the position of the connection between the direct connection line and respective connection contact in the defined first contact sequence by the number of connection lines that terminate in the signal distribution module.

2. A signal transmission apparatus, comprising:
a plurality of serially connected signal distribution modules, each of the signal distribution modules comprising
a first interface having a plurality of first connection contacts which have a defined first contact sequence, and
a second interface having a plurality of second connection contacts which have a defined second contact,
wherein a remainder of the plurality of the first connection contacts is connected to the second connection contacts by direct connection lines such that a position of a connection between a direct connection line and respective connection contact in the defined second contact sequence is shifted with respect to the position of the connection between the direct connection line and respective connection contact in the defined first contact sequence by the number of connection lines that terminate in the signal distribution module,
at least one direct connection between all the serially connected identical signal distribution modules via the identical signal bridges and the respective first and second interfaces, and
a signal transmission bus routed through all signal bridges and via all interfaces.

3. The signal transmission apparatus of claim 2, further comprising an electrical power supply line routed through all signal bridges and via all interfaces.

4. The signal transmission apparatus of claim 3, wherein the power supply line supplies power to or receives power from the at least one signal distribution module.

5. The signal transmission apparatus of claim 2, further comprising a fluid line routed through all signal bridges and via all interfaces.

6. The signal transmission apparatus of claim 5, wherein the fluid line supplies fluid to or receives fluid from the at least one signal distribution module.

7. The signal transmission apparatus of claim 2, wherein all signal bridges are of equal length.

8. The signal transmission apparatus of claim 2, wherein each signal bridge comprises a ribbon cable or a flexible circuit board.

9. The signal transmission apparatus of claim 2, wherein at least one signal distribution module is configured to receive or send signals via the signal transmission bus.

10. The signal transmission apparatus of claim 2, further comprising plug-type connections constructed to connect an interface to a corresponding signal bridge.

11. The signal transmission apparatus of claim 2, wherein each signal bridge connects each connection contact of the first interface of one of the signal distribution modules to exactly one connection contact of the second interface of the adjacent one of the signal distribution modules, wherein the interconnected connection contacts have an identical position in the contact sequence.

12. The signal transmission apparatus of claim 2, wherein the signal distribution modules are configured to control a power converter by open-loop control or closed-loop control.

13. The signal transmission apparatus of claim 12, wherein at least one signal distribution module comprises a driver unit for at least one electronic switching unit of the power converter, with the driver unit being connected to one of the direct connections.

14. The signal transmission apparatus of claim 2, wherein each direct connection between two of the plurality of serially connected signal distribution modules is routed through all signal distribution modules disposed between the two signal distribution modules.

15. A method for transmitting first and second signals between a plurality of serially connected identical signal distribution modules, each of the signal distribution modules comprising
a first interface having a plurality of first connection contacts which have a defined first contact sequence, and
a second interface having a plurality of second connection contacts which have a defined second contact sequence,
wherein at least one connection line connected to at least one of the plurality of the first connection contacts terminates in the signal distribution module,
wherein a remainder of the plurality of the first connection contacts is connected to the second connection contacts by direct connection lines such that a position of a connection between a direct connection line and respective connection contact in the defined second contact sequence is shifted with respect to the position of the connection between the direct connection line and respective connection contact in the defined first contact sequence by the number of connection lines that terminate in the signal distribution module,
the method comprising
connecting a signal bridge between the second interface of a signal distribution module to the first interface of an adjacent one of the serially connected signal distribution modules to form the series connection between the adjacent signal distribution modules, wherein all signal bridges are identical,
routing at least one direct connection between all the serially connected identical signal distribution modules via the identical signal bridges and the respective first and second interfaces,
routing a signal transmission bus through all signal bridges,
transmitting the first signals via the direct connection lines of the signal transmission apparatus; and
transmitting the second signals via the signal transmission bus.

* * * * *

UNITED STATES PATENT AND TRADEMARK OFFICE
CERTIFICATE OF CORRECTION

PATENT NO. : 11,140,000 B2
APPLICATION NO. : 16/961589
DATED : October 5, 2021
INVENTOR(S) : Kraus et al.

Page 1 of 1

It is certified that error appears in the above-identified patent and that said Letters Patent is hereby corrected as shown below:

In the Claims

In Column 9, Claim 2, Line 11 replace "second contact" with --second contact sequence--.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*